3,062,875
DISPLACEMENT REACTIONS OF MYRCENE DIHYDROHALIDE
Joseph P. Bain, Jacksonville, Fla., assignor to The Glidden Company, Cleveland, Ohio, a corporation of Ohio
No Drawing. Filed Nov. 28, 1958, Ser. No. 776,683
5 Claims. (Cl. 260—489)

This invention relates to novel displacement reactions of myrcene dihydrohalide and it relates more particularly to a process for preparing valuable esters and alcohols from myrcene. The invention will be described with reference to displacement reactions of myrcene dihydrochloride although the scope thereof extends to myrcene dihydrohalides selected from the group consisting of myrcene dihydrobromide and myrcene dihydroiodide. Hydrogen chloride, however, is the preferred reactant with myrcene for reasons known to the art.

It is known to pyrolyze beta pinene to the acyclic triene, myrcene, then to hydrochlorinate this to a mixture of monohydrohalides and to convert this mixture, in poor yield, to geranyl and linalyl esters by treatment with sodium acetate. The geranyl and linalyl esters can thereafter, if desired, be saponified to the corresponding alcohols.

The myrcene produced by pyrolysis of beta pinene is 2-methyl-6-methylene-2,7-octadiene and the formation of the geranyl and linalyl esters according to prior art involves addition of hydrogen halide to the conjugate double bond system of myrcene to form geranyl/linalyl halide and thereafter the replacement of the halide by an acyloxy group. The double bond involving the 2 and 3 position (beta position) is therefore not involved in the reactions for the production of geranyl/linalyl esters according to the prior art methods and remains unchanged throughout the series of transformations to produce geranyl/linalyl esters or alcohols. The geranyl/linalyl compounds produced according to prior art methods are therefore beta isomers as distinguished from alpha geraniol and alpha linalool or the alpha compounds in general wherein the double bond involving the number two carbon atom involves the terminal or number one carbon atom rather than the number three carbon atom as in the case of beta-isomer. The difference in the position of the double bond is shown by the following structural formulas:

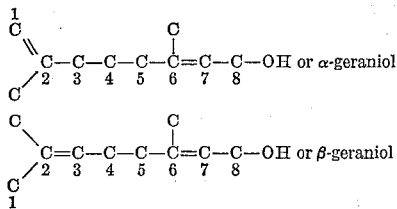

The alpha- and beta-isomers are in general perhaps not identical in odor but are very similar. As a matter of fact, there exists in the literature some controversy as to the identity or proportions of the alpha- and beta-isomers of these alcohols present in the valuable natural oils such as citronella or Bois de Rose. I find that the geranyl and linalyl esters produced according to the process of my invention, rich in the alpha-forms and the corresponding alcohols produced on saponification, are very valuable perfumery ingredients and can be used to replace the natural isolates and their derivatives.

An important reason for the relatively poor yields of the beta-geranyl/linalyl compounds obtained by the prior art procedure of treating myrcene hydrochloride (rich in beta-geranyl/linalyl chlorides) with sodium acetate is that geranyl/linalyl compounds cyclize very readily. Thus, these chlorides cyclize to terpinyl chloride, the esters to terpinyl acetate and the alcohols to terpineol. These cyclization reactions, as well as undesirable dehydrations, take place very readily in the presence of carboxylic acids such as acetic acid which is employed as a common solvent for the myrcene monohydrohalide and the sodium acetate. Also, heating accelerates both types of side reactions. It can be appreciated from the foregoing that it would be desirable to provide new methods for the preparation of improved yields of acyclic alcohols or esters from myrcene.

It is accordingly an object of this invention to provide an improved process for preparation of geraniol and linalool from myrcene.

Another object is to provide a process for obtaining higher yields of geranyl ester from myrcene.

Another object is to provide a process for producing alpha-rich forms of geraniol and linalool and of the esters of these alcohols.

In accomplishment of the foregoing objects of my invention, I have found that improved yields of geraniol, linalool and the esters of these alcohols can be obtained by a process which comprises treating myrcene dihydrohalide with two or more molar equivalents of a carboxylic acid salt or one mole of a carboxylic acid salt and one mole of a base capable of neutralizing the hydrogen halide formed during the reaction, more fully as will be described hereinafter. It is to be understood that by the term "halide" it is intended to include the di-chloride, bromide and iodide of myrcene.

My invention in essence, rests in the discovery that if the double bond involving the β-position in myrcene, that is the number two and three carbon atoms, is protected then the cyclizations responsible for poor yields in the prior art can be substantially eliminated. Thus, from the prior art, it is known that the myrcene produced upon pyrolysis of β-pinene is of the β-type, that is, the isolated double bond involves the number two and three carbon atoms. Further, the treatment afforded myrcene by the prior art always left the number two and three carbon atoms unprotected so that, as noted, acids and heat catalyzed the cyclization of this compound to terpinyl chloride, etc. According to my invention, I protect the number two and three carbon atoms so that such cyclization is not possible. One method which I have found convenient for protecting the isolated double bond is by employing hydrogen chloride which, as noted, also forms the geranyl and linalyl chlorides which are thereafter displaced according to the process of my invention with hydroxyl groups or acyloxy groups to prepare the corresponding alcohols or esters. Other groups can conceivably be used for occupying the number two and three carbon atoms as the hydrogen chloride group, but I have found that the hydrogen chloride molecule is eminently suitable for such a task especially since it is also employed to hydrochlorinate the conjugated end, as noted. I have found that the myrcene dihydrochloride is much more stable thermally than the corresponding monohydrochloride so that it can be heated with a carboxylic acid salt to form an ester without substantial side reactions such as cyclization and dehydrohalogenation with the production of monocyclic terpenes and terpineol. Further, I have found that when the double bond is regenerated in accordance with the conditions of the process herein described, that a large proportion of the unsaturation is recovered as α-unsaturation, i.e., unsaturation involving the number one and two carbon atoms and that this unsaturation is not so subject to the cyclization reaction as is beta-unsaturation. This is advantageous to the process of my invention and, of course, could not have been predicted from the prior art. The double bond in the alpha position of alpha-linalool and alpha-geraniol and their esters can be shifted by prolonged treatment with weak acids to the beta-position but this isomerization is accompanied by the cyclization of the beta-geraniol/linalool formed with a net loss of total acyclic alcohols. I therefore prefer to regenerate the double bond under conditions whereby the acyclic alcohol mixture, largely alpha-forms, is subjected to a minimum of treatment in presence of acids once the double bond involving the number two carbon atom is regenerated.

In a preferred aspect of this invention I provide an overall process which includes converting myrcene to its dihydrohalide and then reacting this with two or more equivalents of an amine, sodium or potassium salt in the presence or absence of a mutual solvent, suitably acetic acid, whereby the allylic halide which forms a part of the dihydrohalide is replaced by an acyloxy group and the tertiary saturated halide present at the number two carbon atom is removed through dehydrohalogenation thereby producing esters of geraniol and linalool rich in the alpha, or isopropenyl forms. One mole of carboxylic acid salt is necessary to react with the alylic halide group to form the ester, the second mole of carboxylic acid salt is necessary to neutralize the strong hydrohalogen acid removed from the saturated tertiary halide group through dehydrohalogenation.

As an alternative to use of the second mole of alkali metal carboxylic salt per mole of dihydrochloride, any other suitable base capable of neutralizing the hydrogen halide formed by the dehydrohalogenation involving the 2-position may be used. Thus as shown in the examples, I can treat myrcene dihydrohalide with one mole of a salt of a carboxylic acid which will cause replacement of the allylic halide by acyloxy plus a second equivalent of a base, say sodium carbonate, which will neutralize the hydrogen halide formed in the dehydrohalogenation of the saturated halide group at the 2-position.

As another alternative, I can treat one mole of myrcene dihydrohalide with one mole of a mono-carboxylic acid plus two or more moles of a base such as triethylamine. One mole of base is required to neutralize the carboxylic acid to form the salt which reacts with the allylic halide group of the myrcene dihydrohalide, the second mole of base is present to neutralize the hydrogen halide formed by dehydrohalogenation from the saturated chloride group in the molecule, i.e., at the 2-position.

The following reactions demonstrate the myrcene dihydrohalides formed by dihydrohalogenation of myrcene and the esters resulting from the treatment of the dihydrohalides with an alkali metal acetate.

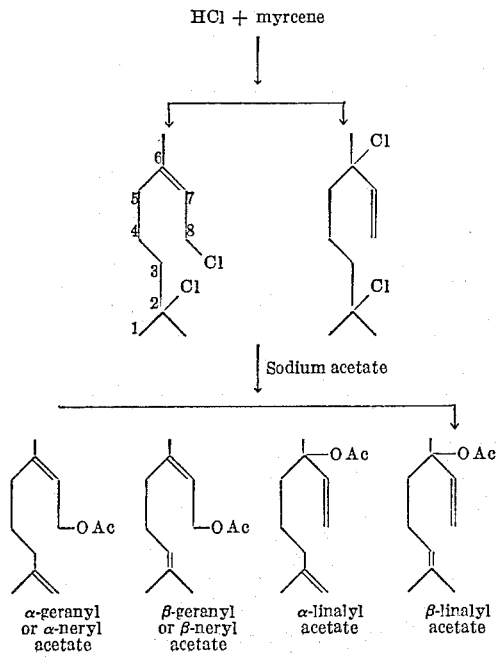

It will be understood that the term "geranyl" is used herein to include "neryl" as geranyl and neryl compounds are cis-trans isomers both of which are produced through the displacement reaction with sodium acetate. The myrcene dihydrochloride described herein is a mixture of 2,6-dichloro-2,6-dimethyl-7-octene and the cis and trans forms of 2,8-dichloro-2,6-dimethyl-6-octene. The ratio of linalyl type to geranyl type halide may vary widely without affecting to an appreciable extent the ratio of geranyl/linalyl ester produced. The structures of the various compounds involved are shown above. The myrcene dihydrochloride can be produced simply by passing hydrogen chloride into myrcene at ambient temperatures and in presence or absence of inert solvents. I find it convenient to operate at moderate temperatures, say 10° C. to 50° C. and to employ the hydrogen chloride under pressure or to speed up the rate of absorption through use of a hydrochlorination catalyst, suitably cuprous chloride.

I prefer to employ sodium acetate as the carboxylic acid salt and acetic acid as the mutual solvent for the myrcene dihydrochloride and sodium acetate if a solvent is used but potassium and other salts can also be used and the carboxylic ion furnished by the salt can be derived from any lower carboxylic acid. I prefer, nevertheless, not to use formic acid as it is sufficiently strong to require great care in its use to avoid acid induced and undesirable isomerization, dehydration and cyclization of the product. In general, sodium acetate and acetic acid are the cheapest and most abundant of the possible reagents and since they are satisfactory and are readily recovered, I therefore prefer to employ them.

While the use of acetic acid as a mutual solvent for myrcene dihydrochloride and carboxylic acid salt has been referred to herein, I prefer to avoid the added cost of employing a solvent. Carboxylic acid is formed from the chloride and carboxylic salt as soon as dehydrochlorination begins. Further, I find that addition of amines to the mixture of myrcene dihydrochloride and carboxylic acid salt provides faster reactions and better yields of the desired products. Accordingly, I prefer to treat the dihydrochloride with two or more moles of the carboxylic acid salt and in the presence of 1% or more amine based on the weight of the myrcene dihydrochloride. Amines such as triethylamine, morpholine, aniline, polyethylene, polyamines and the like are satisfactory. Triethylamine is effective, cheap, readily available and easily recoverable, and I usually employ it. Large excesses of amine can be employed but are not particularly useful and in general, I do not employ more than about 10% amine based on weight of myrcene dihydrochloride taken. In general, however, I can employ nitrogen bases or their salts, e.g., ammonium acetate. The nitrogen bases as noted can be amines, ammonia, amidines, amides, oximes, hydroxyl amine, hydrazones, semicarbazides, imines and the like. The amines can be primary, secondary or tertiary and can be alkyl, aryl or heterocyclic.

It will be found that when the process described herein is employed without use of added carboxylic acid as solvent and with an amine catalyst the ratio of alpha to beta forms of product is improved as the excess carboxylic acid salt present over that required for the reaction plus the added amine buffer the carboxylic acid produced and thereby render it a poorer catalyst for conversion of initially produced alpha-forms of the ester to the beta-forms.

The temperature of reaction is not critical but reactions at low temperatures require an uneconomically long time for completion and high temperatures tend to give poorer yields. In general, I prefer to operate at about 80° C. to 130° C. and for a time sufficient to convert substantially all of the chlorine content of the dihydrochloride into ionizable chloride as determined by analysis of the reaction product for precipitable chloride ion. The reaction is generally complete within four to eight hours when the reaction is conducted within the preferred temperature range. Higher temperatures can be employed if the reaction time is appropriately shortened, as in operating a continuous process but I find it convenient and economical to operate batchwise as described.

Agitation is not necessary in small laboratory batches, but is very desirable in larger commercial batches and particularly if no carboxylic acid solvent is used.

The reaction product can be distilled or partly distilled as by removal of the volatile carboxylic acid, then filtered or washed to remove inorganic salts, then subjected to fractional distillation at reduced pressures to isolate purified ester fractions as desired. Alternatively, it may be treated with water to separate the oily reaction product which can then be distilled to isolate esters or first saponified and then distilled to isolate the corresponding alcohols.

The linalool and geraniol can be used as their esters or as the free alcohols. The alcohols can be selectively oxidized to citral, selectively hydrogenated to dihydrolinalool or dihydrogeraniol (citronellol) or can be converted by other known methods to other valuable compounds useful in perfumery and including the ionones.

The chief ester produced by the process herein described is the geranyl (neryl) ester. Lesser quantities of the valuable linalyl ester and the less valuable terpinyl ester are produced. Small quantities of other esters including traces of diesters are formed but this invention is directed chiefly to synthesis of geranyl and linalyl compounds.

Purified grades of myrcene have been used in producing dihydrohalides but all of the dihydrochloride used in the examples was produced from crude β-pinene pyrolysis mixtures analyzing about 74–76% myrcene. The impurities in such myrcene contribute nothing to the yield of the valuable alcohols, linalool, nerol and geraniol, but can contribute a few percent terpineol in that limonene impurity can be hydrated to terpineol which, of course, also is produced by undesirable cyclization of the valuable alcohols. In calculating yields and comparing with prior art merol and geraniol where shown separately should be added together as "geraniol," since the analytical methods used by prior art were incapable of arcuate analyses of mixtures of these cis-trans isomers. Recent developments of vapor chromatographic methods permit such analyses.

The following examples illustrate my invention.

*Example 1*

To four mols of crude beta-pinene pyrolysate containing about 75% myrcene there was added 258 grams (7.05 mols) of HCl gas (as determined by gain in weight) to give a product having 1.75 mols of HCl per mol of pyrolysate. The β-pinene pyrolysate absorbed hydrogen chloride very rapidly at first, at least through the first mol per mol, but as it approached the second mol the absorption became slower and much of the gas passed through unabsorbed. The absorption was therefore stopped at the stated level which corresponds roughly to dihydrochlorination of the myrcene and monohydrochlorination of the impurities. (Rate of hydrohalogenation can, of course, be improved by operating under a pressure of hydrogen chloride in excess of one atmosphere and/or in the presence of hydrohalogenation catalysts such as iron chloride.)

A mixture of 800 grams of sodium acetate containing some water of crystallization and 1200 grams glacial acetic acid was prepared in a 3 liter flask fitted with a stirrer, thermometer and reflux condenser. The polyhydrochlorinated myrcene mixture was then added and the solution was stirred and warmed slightly. After a time there was some exothermic heat slowly evolved. The reaction mixture was slowly brought to reflux temperature (109° C. initially) and then permitted to stir and reflux for 6 hours. The reaction mixture was allowed to stand overnight. A 10 cc. sample was then removed, the acetic acid washed out and the oil assayed by saponification. It contained 50.2% ester expressed as geranyl acetate. The back titration was made with nitric acid and a blank was used. This was followed by a silver nitrate titration of the saponification liquors for chloride ion, which was negligible. The reaction was therefore essentially complete.

The reaction mixture was filtered to remove the salt and the acetic acid was distilled off with a column at 100 mm. pressure and a pot temperature of up to 110° C. The acetic acid was taken in two cuts. The first cut weighed 987 grams and separated in two phases. The top phase weighed 151 grams and titrated 1.4 normal or about 10% acetic acid. This phase was then washed with water and yielded 132 grams of hydrocarbon free of chlorine by the Beilstein flame test. The bottom phase titrated 13.4 normal and yielded very little oil on dilution. This phase was therefore wet acetic acid.

The second cut totaled 648 grams, was a single phase, and titrated 17 normal or practically pure acetic acid.

The residue from the above distillation was drowned in water and an oil layer amounting to 462 grams was separated. This oil layer showed a weak positive chlorine test. It was next stripped at 149° C. and 10 mm. pressure to recover 346 grams of crude geranyl acetate. The crude mixture also showed a trace of diacetate and the residue still contained some geranyl acetate as shown by steam distillation. The stripped material was then fractionated at 10 mm. pressure and the cuts were analyzed to show the following composition of total distillate.

| Compound: | Amount in grams |
|---|---|
| Hydrocarbons | 100 |
| Linalool, 2-methyl-6-methylene-7-octene-2-ol and α-terpineol acetates | 42 |
| Geranyl acetate (contains α-form) | 180 |
| Diacetate | 10 |

The above data corresponds to a yield of about one pound of geranyl acetate to three pounds of crude pyrolysate charged. It was noted that additional geranyl acetate could be obtained from the residues.

*Example 2*

Beta pinene pyrolysate containing about 75% myrcene by weight was treated with 0.5% of its weight of cuprous chloride and hydrogen chloride was then passed in at about 20° C. to 35° C. until the gain in weight almost corresponded to formation of pyrolysate dihydrochloride.

Five hundred (500) grams of this product corresponding to 325 grams pyrolysate and to 243 grams pure myrcene, was treated with 15 grams triethylamine and 600 grams anhydrous sodium acetate. The mixture was heated to 95° C. and maintained at 95–105° C. for eight hours. After cooling, water was added to dissolve the inorganic salts and free carboxylic acid. After water washing the oil layer, it was dried and weighed 389 grams. It was then fractionated at reduced pressure and the fractions were analyzed by infrared and vapor chromatographic methods. From these data the analysis of the crude ester was evaluated to be: 25% hydrocarbons, 5–7% linalyl acetate (75% alpha form, 25% beta form), 1–3% 2,6-dimethyl-5,7-octadienyl-2-acetate, 1–3% myrcenyl acetate (70–75% alpha form and 25–30% beta form), 5–7% alpha terpinyl acetate, and 55–60% geranyl acetate plus neryl acetate (70–75% alpha form and 25–30% beta form). The weight yield of geranyl ester based on weight of myrcene content of the pyrolysate is therefore over 85%, far above any claimed in the prior art.

*Example 3*

A mixture of one mole of myrcene dihydrochloride, two moles potassium benzoate and four grams triethylamine was heated with stirring to 90–95° C. and held at this temperature for 8 hours. It was then cooled and water soluble products were removed by washing. The infrared spectrum of the washed and dried oil showed the presence of benzoate esters but was, of course, too complex to analyze with respect to the identity of the alkyl groups. The ester was then saponified and the volatile materials were steam distilled, dried and analyzed by vapor phase chromatography. This analysis showed the saponified oil consisted of:

|  | Percent |
|---|---|
| Hydrocarbons | 33.0 |
| Linalool | 19.4 |
| Minor alcohols | 8.5 |
| Terpineol | 12.6 |
| Nerol ($\alpha+\beta$) | 6.8 |
| Geraniol ($\alpha+\beta$) | 18.7 |

The minor alcohols are probably a mixture of 2-methyl-6-methylene-7-octene-2-ol and 2,6-dimethyl-5,7-octadiene-2-ol.

*Example 4*

An additional experiment was run under the same conditions of temperature, agitation and time as those of Example 3 and the crude products were worked up and saponified in the same way. Shown below are the reagents used and the analysis of the saponified and steam distilled and dried crude alcohols.

| Hydro-Carbons | Linalool | Minor Alcohols | Terpineol | Nerol | Geraniol |
|---|---|---|---|---|---|
| 37.5 | 3.2 | 3.8 | 6.5 | 17.2 | 31.7 |

Reagents:
One mole myrcene dihydrochloride
One mole sodium acetate
1.25 equivalents sodium carbonate
4 grams triethylamine From the above description of my invention it should be understood that any carboxylic acid salt will work in the process of my invention. Manipulations may be required to obtain significant yields in some of the cases, e.g. where the carboxylic acid salt is insoluble to some degree with myrcene or the solvent employed, or where the metal halide resulting from the reaction is too soluble in the reaction mixture and thereby interferes with the reaction, etc. All of these problems have been resolved satisfactorily so that my statement that any carboxylic acid salt will work is justified. Thus in cases where the alkali metal salt (e.g. sodium or potassium) of furoic, oxalic, citric, tartaric, phthalic, maleic and fumaric acids, is used, it is possible that a low ester content may be obtained. It has been found that in such cases the carboxylic acid salts mentioned are not too soluble in the reaction mixture and the yields of esters can be increased by simply using the amine salts of the acids. Good yields of esters can be obtained by the employment of salts of the lower carboxylic acids, e.g. acetic, propionic, butyric, valeric, etc., and also the higher acids such as decanoic. Also, sebacic, tall oil acids etc. can be used.

Some of the metal salts of the carboxylic acids may result in soluble metal halides which are objectionable. For example, metals such as calcium, lithium, magnesium or aluminum have been found to result in soluble chloride salts. In these cases I find it expedient to add a solvent such as benzene or acetone etc., to decrease the solubility of the resulting metal chloride and force the reaction toward the formation of the ester.

Likewise, the term "base" is to be understood as a compound capable of neutralizing hydrogen chloride (bromide or iodide) formed from the reaction, e.g. the dehydrohalogenation of the number two and three carbon atoms of the myrcene molecule. This, of course, is understood from a glance at all the amine, carboxylic acid salts, etc. applicable herein since only two or more moles of acid salt need be employed. My invention is not concerned with any novel reactions involving specific carboxylic acid salts or bases, but is concerned with a concept and a process which successfully satisfy the objects of my invention denoted elsewhere in this specification.

Having thus described my invention, I hereby claim:

1. The improved process for producing acyclic allylic terpene esters from myrcene which consists essentially in first hydrohalogenating myrcene by reacting said myrcene with a hydrogen halide selected from the group consisting of HBr and HCl until substantially 2 moles of hydrogen halide are absorbed by the myrcene, and treating the resulting dihydrohalide with a metal salt of a carboxylic acid and a base capable of neutralizing hydrogen halide until substantially all of the halogen has been removed from said dihydrohalide, the amount of said salt being at least sufficient to replace the allylic halogen by an acyloxy radical and the amount of said base being sufficient to neutralize hydrogen halide formed during the reaction.

2. The process of claim 1 in which the halide is a chloride.

3. The process of claim 1 in which the metal salt is used in an amount sufficient to supply all of the base necessary to form metal halide with all of the halogen of the dihydrohalide.

4. The process of claim 1 in which the amount of carboxylic acid salt and the dihydrohalide are substantially equimolecular and the replacement reaction is carried out in the presence of at least one equivalent of an inorganic base for each molecular weight of dihydrohalide.

5. The process of claim 1 in which the salt is a sodium salt of a lower fatty acid.

References Cited in the file of this patent

UNITED STATES PATENTS 2,609,388 Knapp et al. _____ Sept. 2, 1952
2,833,812 Surmatis _____ May 6, 1958

OTHER REFERENCES

Fuson: "Advanced Organic Chemistry," 1950, pages 148–149.